United States Patent [19]
Karlsson et al.

[11] Patent Number: 6,167,039
[45] Date of Patent: Dec. 26, 2000

[54] MOBILE STATION HAVING PLURAL ANTENNA ELEMENTS AND INTERFERENCE SUPPRESSION

[75] Inventors: Jonas Karlsson, Kista; Björn Gudmundson, Sollentuna; Ulf Forssén, Saltsjö-boo; Sara Mazur, Bromma, all of Sweden

[73] Assignee: Telefonaktiebolget LM Ericsson, Stockholm, Sweden

[21] Appl. No.: 08/992,174

[22] Filed: Dec. 17, 1997

[51] Int. Cl.[7] .................................................... H04J 13/00
[52] U.S. Cl. ........................ 370/342; 370/320; 370/335; 375/203; 455/562
[58] Field of Search ..................................... 370/310, 319, 370/320, 321, 342, 335, 336, 337, 343, 344, 347; 375/202, 203, 206, 340; 342/375; 455/562

[56] References Cited

U.S. PATENT DOCUMENTS

| | | | |
|---|---|---|---|
| 4,715,048 | 12/1987 | Masamura | 375/100 |
| 5,159,707 | 10/1992 | Mogi et al. | 455/134 |
| 5,204,979 | 4/1993 | Schenkyr et al. | 455/276.1 |
| 5,313,660 | 5/1994 | Lindenmeier et al. | 455/135 |
| 5,515,378 | 5/1996 | Roy, III et al. | 370/95.1 |
| 5,757,318 | 5/1998 | Reudink | 342/375 |
| 5,864,548 | 1/1999 | Liu | 370/320 |
| 5,926,502 | 7/1999 | Schilling | 375/203 |
| 5,926,503 | 7/1999 | Kelton et al. | 375/206 |
| 5,937,014 | 8/1999 | Pelin et al. | 375/340 |
| 5,966,670 | 10/1999 | Keskitalo et al. | 455/562 |

FOREIGN PATENT DOCUMENTS

| | | | |
|---|---|---|---|
| 600547 | 6/1994 | European Pat. Off. | H04B 7/08 |
| 674401 | 9/1995 | European Pat. Off. | H04B 1/707 |
| 09-069808 | 3/1997 | Japan | H04B 7/04 |

OTHER PUBLICATIONS

Ayman F. Naguib et al., "Recursive Adaptive Beamforming for Wireless CDMA", Information Systems Lab, Standford Univ., ICC '95, Seattle, U.S.A. (Jun. 18–22, 1995), pp. 1515–1519.

International Search Report re RS 100850 Date of mailing of search: Sep. 23, 1998.

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

Mobile stations using antenna diversity are described. Techniques for combining CDMA signals received over plural antennas at a mobile unit are provided which suppress interference from undesired base stations.

21 Claims, 4 Drawing Sheets

MOBILE STATION HAVING PLURAL ANTENNA ELEMENTS AND INTERFERENCE SUPPRESSION

BACKGROUND

The present invention relates generally to radio communication systems and, more specifically, to methods for interference suppression to improve the quality of signals received in mobile stations.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology. Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure. An important feature desired in these new systems is increased traffic capacity.

Currently, channel access is primarily achieved using Frequency Division Multiple Access (FDMA) and Time Division Multiple Access (TDMA) methods. In FDMA, a communication channel is a single radio frequency band into which a signal's transmission power is concentrated. Signals which can interfere with a communication channel include those transmitted on adjacent channels (adjacent channel interference) and those transmitted on the same channel in other cells (co-channel interference). Interference with adjacent channels is limited by the use of band pass filters which only pass signal energy within the specified frequency band. Co-channel interference is reduced to tolerable levels by restricting channel re-use by providing a minimum separation distance between cells in which the same frequency channel is used. Thus, with each channel being assigned a different frequency, system capacity is limited by the available frequencies as well as by limitations imposed by channel reuse. FDMA was used for channel access in first generation systems such as AMPS.

In TDMA systems, a channel consists of, for example, a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, with each channel being assigned a different time slot, system capacity is limited by the available time slots as well as by limitations imposed by channel reuse as described above with respect to FDMA. TDMA has been used to provide channel access for second generation radiocommunication systems, such as D-AMPS.

With FDMA and TDMA systems (as well as hybrid FDMA/TDMA systems), one goal of system designers is to ensure that two potentially interfering signals do not occupy the same frequency at the same time. In contrast, Code Division Multiple Access (CDMA) is a channel access technique which allows signals to overlap in both time and frequency. CDMA is a type of spread spectrum communications, which have been around since the days of World War II. Early applications were predominantly military oriented. However, today there has been an increasing interest in using spread spectrum systems in commercial applications since spread spectrum communications provide robustness against interference, which allows for multiple signals to occupy the same bandwidth at the same time. Examples of such commercial applications include digital cellular radio, land mobile radio, and indoor and outdoor personal communication networks.

In a typical CDMA system, an information data stream to be transmitted is impressed upon a much-higher-bit-rate data stream produced by a pseudorandom code generator. The information signal and the pseudorandom signal are typically combined by multiplication in a process sometimes called coding or spreading the information signal. Each information signal is allocated a unique spreading code. A plurality of coded information signals are transmitted as modulations of radio frequency carrier waves and are jointly received as a composite signal at a receiver. Each of the coded signals overlaps all of the other coded signals, as well as noise-related signals, in both frequency and time. By correlating the composite signal with one of the unique spreading codes, the corresponding information signal can be isolated and decoded.

Transmit power control methods are important to CDMA communication systems having many simultaneous transmitters because such methods reduce the mutual interference of such transmitters. Depending upon the system characteristics, power control in such systems can be important for the uplink (i.e., for transmissions from a remote terminal to the network), the downlink, (i.e., for transmissions from the network to the remote terminal) or both. Like TDMA, CDMA has been used to provide channel access in some later developed second generation systems, such as IS-95.

As information technologies and communication technologies continue to grow closer together, demand for high data rate support (e.g., greater than 56 kbit/s) is rapidly increasing, particularly with the advent of the Internet and the desire to transmit video information. Second generation radiocommunication systems were not designed to handle such high data rates. Accordingly, third generation systems are now under development, for which both TDMA and wideband CDMA are being considered for channel access.

One of the features of a wideband CDMA cellular system, compared to today's narrowband systems, is the potential to support data communication with high data rates, e.g., 384 kbit/sec. Mobile stations communicating at such high data rates will, however, consume a great deal of the system capacity. To reduce the impact of high data rate users on system capacity, these users may be required to operate on signals which have a lower signal-to-noise ratio ($E_b/N_0$), i.e, their receivers may be required to handle more interference.

Moreover, the introduction of so-called "home" base stations into radiocommunication systems may create situations where new types of localized, low signal-to-noise ratio, signals exist. The home base station concept involves providing users with base station units in their homes which their mobile units can communicate with to place calls when the users are at home. Access to these home base stations is intended to be restricted to only authorized home users.

Thus, other units connected to the radiocommunication which pass by the home base station(s) may experience additional localized interference and a corresponding reduction in signal-to-noise ratio for the signal supporting their connection.

Meeting system requirements to handle less robust signals could be achieved by introducing a more advanced receiver algorithm (i.e., to provide improved detection of relatively fainter signals). However, there are limits on the ability of receiver algorithms to resolve symbols in signals having very low $E_b/N_0$. Applicants have recognized that another possible solution lies in using receiver diversity, i.e., multiple antennas at the mobile station, and combining the received signals to overcome the reduction in $E_b/N_0$.

Antenna diversity techniques are based on the knowledge that when the path lengths that signals traverse over the transmission medium are relatively small, the multiple signal images arrive at almost the same time. The images add either constructively or destructively, giving rise to fading, which typically has a Rayleigh distribution. When the path lengths are relatively large, the transmission medium is considered time dispersive, and the added images can be viewed as echoes of the transmitted signal, giving rise to intersymbol interference (ISI).

Fading can be mitigated by having multiple receive antennas and employing some form of diversity combining, such as selective combining, equal gain combining, or maximal ratio combining. Diversity takes advantage of the fact that the fading on the different antennas is not the same, so that when one antenna has a faded signal, chances are the other antenna does not.

The usage of multiple antennas in radiocommunication systems for diversity is, per se, known. For example, an algorithm used to process signals received via an array antenna in a base station is described in Naguib, Ayman F. et al., Recursive Adaptive Beamforming for Wireless CDMA, IEEE 1995. However, like that described in Naguib, most applications of antenna diversity have been practiced at the base station for receiving signals transmitted by mobile stations on the uplink. Very few systems have implemented mobile stations having multiple antennas.

One example of antenna diversity at the mobile station, i.e., for processing signals transmitted by the base station on the downlink, is found in the Japanese PDC system. The PDC system uses so-called switch diversity, whereby the receiver in the mobile station selects either of the two versions of the signal coupled to its antennas. This form of diversity is, however, rather simplistic since it does not combine the received signals and, therefore provides relatively low performance. Moreover, this prior implementation of diversity at the mobile station failed to address the significant localized interference problems which will be presented by the home base stations and the upcoming need for higher data transmission rates.

Accordingly, there exists a need to provide techniques for handling the combining of signals received at mobile stations in radiocommunication systems and, more particularly, for handling the processing of plural signals received via antenna array elements at a mobile station.

SUMMARY

It is an object of the present invention to overcome the deficiencies described above by providing a receiver having the capability to process plural signals received via an array antenna and to suppress interference, which capability is adapted for use with receivers disposed in mobile stations. This capability will, in turn, allow mobile stations according to the present invention to operate on signals having lower signal-to-noise ratios than those currently in use today.

Mobile stations according to the present invention use plural antennas (or antenna elements) to receive their intended signals and combine signals received over the plural antennas using in a manner which suppresses the interference associated with the transmissions from other, e.g., home, base stations. More specifically, techniques according to the present invention apply the interference covariance matrix to optimally suppress interference from undesired base stations. The suppression can be achieved without knowledge of the spreading sequence of the interfering base stations or without needing to demodulate the data sent by the desired base station. If the number of interfering rays is lower than the number of antennas or array elements, then interference suppression is very large using techniques according to the present invention, resulting in markedly improved received signal quality.

Since the present invention relates primarily to processing signals at the mobile station, i.e., downlink transmissions, rather than the uplink, the fact that orthogonal spreading sequences are used typically for the downlink is taken into account. As a consequence, weighting factors used to weight each received signal version are calculated by exemplary embodiments of the present invention using the covariance matrix of all signals, rather than the interference covariance matrix.

Mobile stations operating in accordance with the present invention provide a number of advantages over conventional mobile stations. Due to their ability to suppress interference associated with signals transmitted from other base stations, mobile stations according to the present invention will tend to reduce the number of soft handoffs which might otherwise be performed at cell borders. For example, a mobile station operating near a cell border may receive a strong, interfering signal from a neighboring base station. The strength of the received signal may trigger handoff algorithms in the system which force a handoff of the mobile station from its current base station to the neighboring base station. This handoff may be avoided if the neighboring base station's signal can be sufficiently suppressed, thereby also providing adequate received signal quality from the base station to which the mobile station is currently connected. A general reduction in the number of handoffs will also reduce system-wide interference and increase system capacity.

BRIEF DESCRIPTION OF THE DRAWINGS

These and other objects, features and advantages of the present invention will be readily apparent to one skilled in the art from the following written description, read in conjunction with the drawings, in which.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
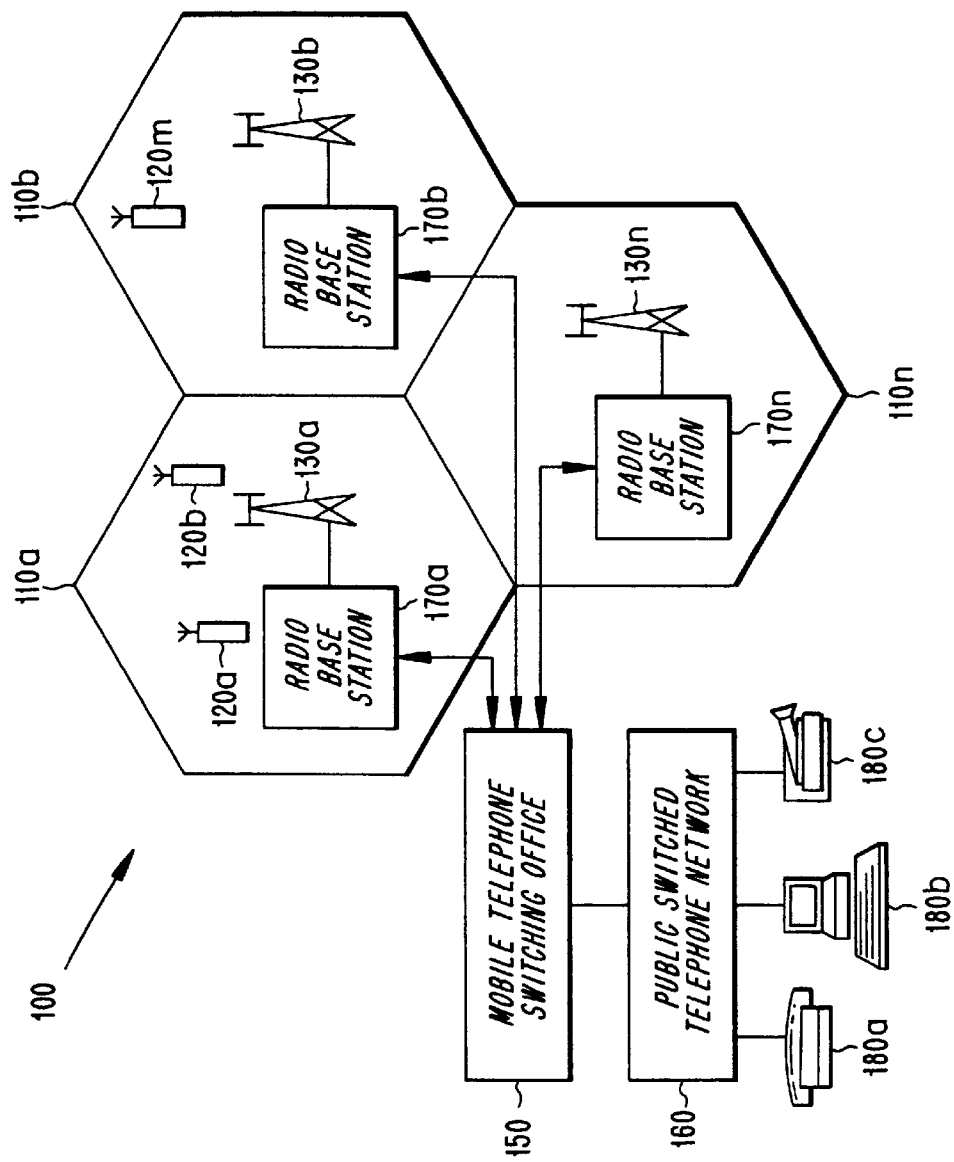
FIG. 1 illustrates a general cellular radiocommunication system.

An exemplary cellular radio communication system 100 is illustrated in FIG. 1. As shown therein, a geographic region served by the system is subdivided into a number, n, of smaller regions of radio coverage known as cells 110a–n, each cell having associated with it a respective radio base station 170a–n. Each radio base station 170a–n has associated with it a plurality of transmit and receive radio antennas 130a–n. Note that the use of hexagonal-shaped cells 110a–n is employed as a graphically convenient way of illustrating areas of radio coverage associated with a particular base station 170a–n. In actuality, cells 110a–n may be irregularly shaped, overlapping, and not necessarily contiguous. Each cell 110a–n may be further subdivided into sectors according to known methods. Distributed within cells 110a–n are a plurality, m, of mobile stations 120a–m. In practical systems the number, m, of mobile stations is much greater than the number, n, of cells. Base stations 170a–n comprise inter alia a plurality of base station transmitters and base station receivers (not shown) which provide two-way radio communication with mobile stations 120a–m located within their respective calls. As illustrated in FIG. 1, base stations 170a–n are coupled to the mobile telephone switching office (MTSO) 150 which provides inter alia a connection to the public switched telephone network (PSTN) 160 and henceforth to communication devices 180a–c. The cellular concept is known to those skilled in the art and, therefore, is not further described here.

Figure 2:
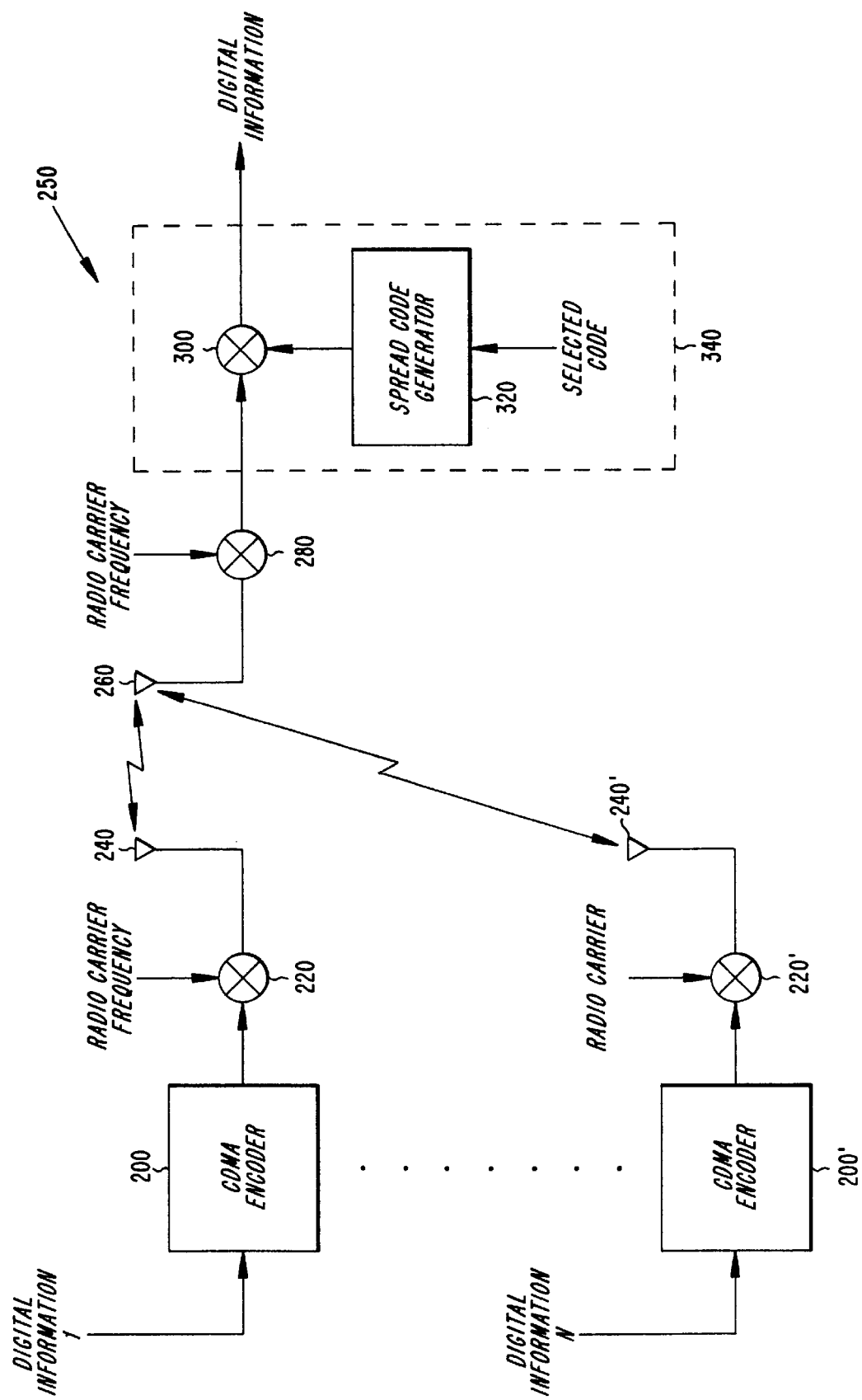
FIG. 2 is a very general block diagram of a CDMA transmission and reception system.

As mentioned above, radio communications between the base stations and the mobile stations can be implemented using direct sequence code division multiple access (DS-CDMA). FIG. 2 generally illustrates this concept. Digital information 1 to be transmitted over an RF communications channel is coded in a CDMA encoder 200. The coded signal is used to modulate an RF carrier in a mixer 220. The modulated carrier is transmitted over an air interface via a transmitting antenna 240. Other digital information from other transmitters, e.g., 2 . . . N, may be transmitted in a similar fashion. A receiving antenna 260 of a receiver 250 receives a composite, RF signal and demodulates the composite signal using another mixer 280. The desired signal is extracted from the composite signal by correlation with the code assigned to that receiver for this particular connection at block 300. This code is generated using a pseudorandom number generator 320 which is part of decoder 340. The digital information extracted in this manner is then typically processed downstream by other known components, e.g., a RAKE combiner can be used to combine signal rays in a known manner.

Figure 3:
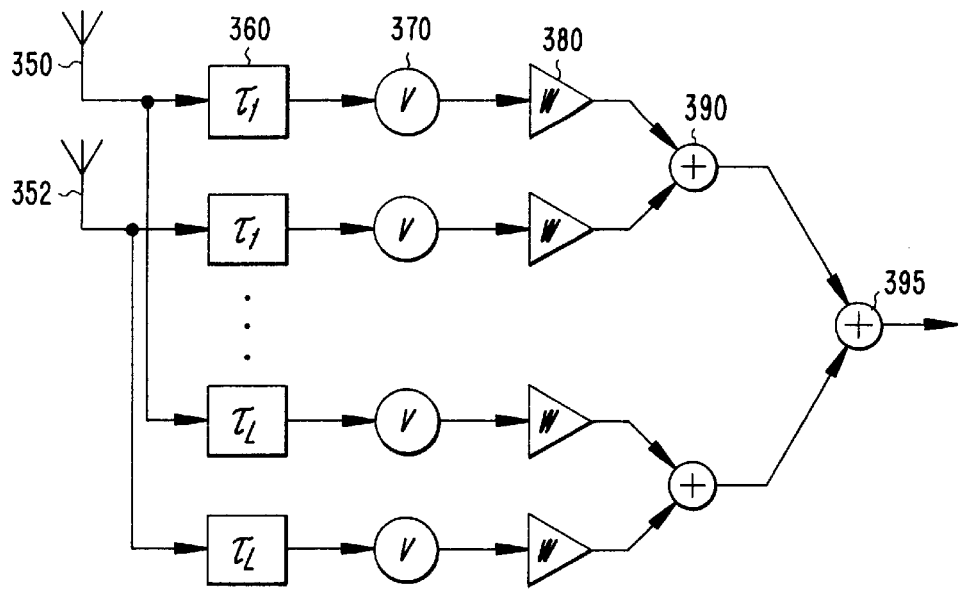
FIG. 3 illustrates receiver architectures according to the present invention.

As mentioned above, the usage of plural antennas at the mobile station can provide enhanced performance. The present invention provides optimization techniques for combining the various received signal versions which in turn provides improved performance over the conventional maximal ratio combining employed by conventional RAKE receivers. FIG. 3 illustrates a mobile station receiver structure according to an exemplary embodiment of the present invention.

Therein, signals are received over two antennas 350 and 352. Although this exemplary embodiment illustrates just two antennas, those skilled in the art will appreciate that the present invention is equally applicable to combining signals received over three or more antennas. In order to obtain more than one antenna signal, several ways of providing additional antennas exist. In a hand-held mobile station, a dual-polarized antenna can be used to obtain two signals or a second antenna can be located in the phone flip. In advanced data terminals which are larger in size than the hand-held units, several antennas can be placed at various locations of the data terminal and each of these can be dual-polarized. Many variations and modifications will be appreciated by those skilled in the art for providing plural antenna signals to processing units according to the present invention.

Each received signal is then processed in a plurality of receive signal branches. Each branch includes a delay unit 360, a despreading unit 370, and a weighting unit 380. Delay units 360 and despreading units 370 operate in a conventional manner and, accordingly, are not further described here. Weighting unit 380 weights the output of each despreading unit using a complex weighting vector which takes into account the objective of suppressing interference from unwanted transmitters which is performed by first combiner 390 and RAKE (maximal ratio) combining at second combiner 395. The technique for calculating optimal weighting factors according to the present invention to provide for better received signal quality will now be discussed in detail.

The following time discrete model is used for describing the downlink of an exemplary CDMA system to provide a basis for calculating the weighting factors to be used in mobile receivers according to the present invention. The model is formulated with one chip as time resolution and assumes perfect time delay estimation, perfect channel estimation, no power control, that all received rays are uncorrelated (e.g., signals from different base stations are uncorrelated, signals from different users within one base station are uncorrelated and rays from individual users are uncorrelated), that the spreading sequences used by base stations to transmit on the downlink are orthogonal and that the mean energy levels of received signals at each antenna or antenna element are equal. However, those skilled in the art will appreciate that these assumptions are made solely to simplify performance evaluation and that the present invention is intended to include implementations wherein these assumptions are not valid.

Let the mobile station receive signals from B base stations. All base stations use the spreading factor G, and each base station transmits data to $N_b$ mobile stations, where b=1, . . . , B is used as a base station index.

The radio channel from the base stations to the mobile station is modeled by a FIR filter with filter coefficients having Rayleigh distributed amplitudes. The channels from different base stations are assumed to be uncorrelated. Let the number of rays from base station b be Lb, and assume that different rays have uncorrelated channels. The average total power transmitted for each user can be individually set to the value $P_{b,n}$ where n=1, ..., $N_b$ is used as user index. The mean power of each ray is set to $P_{b,n,l}$, where:

$$P_{b,n} = \sum_{l=1}^{L_b} P_{b,n,l} \quad (A.1)$$

The mobile station receives the signals with M antennas. All antennas are assumed to receive the signals with the same mean energy level. To obtain uncorrelated signals in the mobile station, the distance between two antennas can be rather small, it is therefore assumed that the radio channels from a base station to the M receiving antennas at the mobile station are uncorrelated. The antenna response vector:

$$a_{b,l} = [a_{b,l,1} \ldots a_{b,l,M}]^T \quad (A.2)$$

is used to model both the actual antenna respond and the radio channel, except from the mean power of each ray. This is achieved by letting $a_{b,l,m}$ have Rayleigh distributed amplitude and random phase. The expected squared amplitudes are the same for all antennas, $$E\{|a_{b,l,1}|^2\} = \ldots = E\{|a_{b,l,M}|^2\} = 1 \quad (A.3)$$

for all b and l.

Then the received signal at the M antennas from user n at base station b can be expressed as:

$$x_{b,n,l}[k] = \sqrt{P_{b,n,l}} \, d_{b,n}[k - \tau_{b,l}] c_{b,n}[k - \tau_{b,l}] a_{b,l} \quad (A.4)$$

where k is the time index on chip level, $\tau_{b,1}$ is the time delay for ray l from base station b, $d_{b,n}[k]$ is the data bit sent to user n from base station b, and $c_{b,n}[k]$ is the spreading chip.

In addition to the signals from all base stations, white Gaussian noise is added to the antennas, n[k], $$E\{n[k]n_H[k]\} = \sigma_n^2 I.$$

Finally the signals received at the mobile station can be expressed as:

$$x[k] = \sum_{b=1}^{b} \sum_{n=1}^{N_b} \sum_{l=1}^{L_b} x_{b,n,l}[k] + n[k] \quad (A.5)$$

This model of the CDMA signals received at a mobile station can now be used to derive the bit error rate for a user 1 communicating with base station 1. First, the signal-to-noise ratio experienced by this mobile station is calculated by rewriting the sum (A.5) as:

$$x[k] = x_{1,1,l}[k] + \sum_{\substack{p=1 \\ p \neq l}}^{L_1} x_{1,1,p}[k] + \sum_{n=2}^{N_1} \sum_{p=1}^{L_1} x_{1,n,p}[k] + \sum_{b=2}^{B} \sum_{n=1}^{N_b} \sum_{l=1}^{L_b} x_{b,n,l}[k] + n[k] \quad (B.1)$$

Denote the interfering terms as:

$$i[k] = \sum_{\substack{p=1 \\ p \neq l}}^{L_1} x_{1,1,p}[k] + \sum_{n=2}^{N_1} \sum_{p=1}^{L_1} x_{1,n,p}[k] + \sum_{b=2}^{B} \sum_{n=1}^{N_b} \sum_{p=1}^{L_b} x_{b,n,p}[k] \quad (B.2)$$

which gives:

$$x[k] = x_{1,1,l}[k] + i[k] + n[k] \quad (B.3)$$

The covariance between each ray is:

$$E\{x_{b,n,p}[k] x_{b,n,p}^H[k]\} = E\{\sqrt{P_{b,n,p}} \, d_{b,n}[k - \tau_{b,p}] c_{b,n}[k - \tau_{b,p}] \\ a_{b,p} a_{b,p}^H c_{b,n}*[k - \tau_{b,p}] d_{b,n}*[k - \tau_{b,p}] \sqrt{P_{b,n,p}}\} P_{b,n,p} a_{b,p} a_{b,p}^H \quad (B.4)$$

and since it is assumed that all rays are uncorrelated, the cross-correlation for the interfering rays are:

$$E\{i[k] i^H[k]\} = \sum_{\substack{p=1 \\ p \neq l}}^{L_1} P_{1,1,p} a_{1,p} a_{1,p}^H + \\ \sum_{n=2}^{N_1} \sum_{p=1}^{L_1} P_{1,n,p} a_{1,p} a_{1,p}^H + \sum_{b=2}^{B} \sum_{n=1}^{N_b} \sum_{p=1}^{L_b} P_{b,n,p} a_{b,p} a_{b,p}^H \quad (B.5)$$

The received signal x[k] is appropriately delayed and despread by multiplying with the conjugated spreading sequence, e.g., at blocks 360 and 370, respectively, in FIG. 3. The despread symbols from the l:th ray of the user 1 from base station 1 are:

$$y_{1,1,l} = \frac{1}{\sqrt{g}} \sum_{k=0}^{G-1} c_{1,1}^H[k - \tau_{1,l}] x[k] = \underbrace{\sqrt{G} \sqrt{P_{1,1,l}} \, d_{1,1} a_{1,l}}_{s_{1,1,l}} + \\ \underbrace{\frac{1}{\sqrt{G}} \sum_{k=0}^{G-1} c_{1,1}^H[k - \tau_{1,l}] i[k]}_{i_{1,1,l}} + \underbrace{\frac{1}{\sqrt{G}} \sum_{k+0}^{G-1} c_{1,1}^H[k - \tau_{1,l}] i[k]}_{n_{1,1,l}} \quad (B.6)$$

It can be seen that:

$$E\{i_{1,1,l} i_{1,1,l}^H\} = \sum_{\substack{p=1 \\ p \neq l}}^{L_1} P_{1,1,p} a_{1,p} a_{1,p}^H + \\ \sum_{n=2}^{N_1} \sum_{p=1}^{L_1} P_{1,n,p} a_{1,p} a_{1,p}^H + \sum_{b=2}^{B} \sum_{n=1}^{N_b} \sum_{p=1}^{L_b} P_{b,n,p} a_{b,p} a_{b,p}^H \quad (B.7)$$

and $$E\{n_{1,1,l} n_{1,1,l}^H\} = \sigma_n^2 I \quad (B.8)$$

The covariance of the pre-correlation vector x[k] is:

$$R_{xx} = \\ E\{x[k] x^H[k]\} = E\{x_{1,1,l}[k] x_{1,1,l}^H[k]\} + E\{i[k] i^H[k]\} + E\{n[k] n^H[k]\} = \quad (B.9)$$

$$P_{1,1,l}a_{1,l}a_{1,l}^H + \sum_{\substack{p=1 \\ p \neq l}}^{L_1} P_{1,1,p}a_{1,p}a_{1,p}^H +$$

$$\sum_{n=2}^{N_1}\sum_{p=1}^{L_1} P_{1,n,p}a_{1,p}a_{1,p}^H + \sum_{b=2}^{B}\sum_{n=1}^{N_b}\sum_{p=1}^{L_b} P_{b,n,p}a_{b,p}a_{b,p}^H + \sigma_n^2 I$$

and the covariance of the post-correlation vector $y_{1,1,1}$ is:

$$R_{yy,1} = E\{y_{1,1,l}y_{1,1,l}^H\} = \tag{B.10}$$
$$E\{s_{1,1,l}s_{1,1,l}^H\} + E\{i_{1,1,l}i_{1,1,l}^H\} + E\{n_{1,1,l}n_{1,1,l}^H\} = GP_{1,1,l}a_{1,l}a_{1,l}^H +$$
$$\sum_{n=2}^{N_1}\sum_{\substack{p=1 \\ p \neq l}}^{L_1} P_{1,n,p}a_{1,p}a_{1,p}^H + \sum_{b=2}^{B}\sum_{n=1}^{N_b}\sum_{p=1}^{L_b} P_{b,n,p}a_{b,p}a_{b,p}^H + \sigma_n^2 I$$

where the dependence of the base station number and the user number have been left out in $R_{yy,1}$. By introducing $u_{1,1,1} = i_{1,1,1} + n_{1,1,1}$, the despread signal can be divided into one wanted part and one unwanted part $y_{1,1,1} = s^{1,1,1} + u_{1,1,1}$, where the covariance of the unwanted part is:

$$R_{uu,1}E\{u_{1,1,l}u_{1,1,l}^H\} = \tag{B.11}$$
$$\sum_{n=1}^{N_1}\sum_{\substack{p=1 \\ p \neq l}}^{L_1} P_{1,n,p}a_{1,p}a_{1,p}^H + \sum_{b=2}^{B}\sum_{n=1}^{N_b}\sum_{p=1}^{L_b} P_{b,n,p}a_{b,p}a_{b,p}^H + \sigma_n^2 I$$

After despreading the signals for ray 1, the signals are combined using a weight vector $w_1$.

$$y_l = w_l^H y_{1,1,l} = w_l^H s_{1,1,l} + w_l^H u_{1,1,l} \tag{B.12}$$

The SNIR after the combining is:

$$\gamma_l(w_l) = \frac{E\{w_l^H s_{l,l,l}\}}{E\{w_l^H u_{l,l,l}\}} = \frac{GP_{l,l,l}|w_l^H a_{l,l}|^2}{w_l^H R_{uu,l} w_l} \leq GP_{l,l,l}a_{l,l}^H R_{uu,l}^{-1} a_{l,l} \tag{B.13}$$

where the maximum SNIR (using Schwarz inequality)

$$\gamma_l = GP_{l,l,l}a_{l,l}^H R_{uu,l}^{-1} a_{l,l} \tag{B.14}$$

is obtained if and only if $$w_{IRC,l} = \eta R_{uu,l}^{-1} a_{l,l} \tag{B.15}$$

where $\eta$ is a constant and IRC stands for Interference Rejection Combining.

Under the assumption that different rays are uncorrelated, the optimum combining is performed at blocks 380 if the despread and combined signals from each ray are weighted with their corresponding SNIR and added together. The SNIR per bit of the final combined signal is:

$$\gamma_b = \sum_{l=1}^{L_1} \gamma_l = G\sum_{l=1}^{L_1} P_{l,l,l}a_{l,l}^H R_{uu,l}^{-1} a_{l,l} \tag{B.16}$$

As mentioned above, in addition to optimizing the weighting factor for interference suppression, the weighting factor should also be optimized for RAKE combining. The conventional RAKE procedure for combining several rays and signals from several antennas is to use maximum ratio combining (MRC), i.e., multiply each ray with the complex conjugate of its channel estimate and sum all signals.

The MRC combiner weights are obtained by assuming that the interference is spatially uncorrelated, i.e., that the off-diagonal elements of $R_{uu,1}$ are zero. The MRC weight vector is therefore:

$$w_{MRC,l} = \eta \text{diag}(R_{uu,l})^{-1} a_{l,l} \tag{B.17}$$

Given the SNIR after combining it is possible to calculate the corresponding bit error rate (BER). BER for an AWGN channel is given in the well known book on digital signal processing entitled *Digital Communications* by J. G. Proakis, McGraw-Hill, 3rd Edition, 1995, (assuming BPSK modulation purely as an example) such that:

$$P_b(\gamma) = Q(\sqrt{2\gamma}) \tag{B.18}$$

where $$Q(x) = \frac{1}{\sqrt{2\pi}} \int_x^\infty e^{-t^2/2} dt \tag{B.19}$$

The BER for a general channel is $$P_e = \int_0^\infty P_b(\gamma) f_{\gamma_b}(\gamma) d\gamma \tag{B.20}$$

where $f_{\lambda_b}(\lambda)$ is the probability distribution of the SNIR. This distribution depends on all parameters associated with all the users, e.g., the channel model, and is hard to compute analytically. Instead, numerical methods can be used.

If $\lambda$ in (B.20) is considered as a time varying function, and all the parameters associated with all the users are varied according to their distributions, then it is possible to approximate the infinite integral with a finite sum:

$$P_{est} = \frac{1}{N}\sum_{k=1}^{N} P_b(\gamma(k)) \tag{B.21}$$

where $\lambda(k)$ is calculated according to (B.16) with a new realization of all parameters for each k.

The steering vector $a_{1,1}$ used in the optimum weights (B.15) can be estimated in the following way.

From (B.9) and (B.10) we get:

$$R_{yy,l} = GP_{1,1,l}a_{1,l}a_{1,l}^H - P_{1,1,l}a_{1,l}a_{1,l}^H - \sum_{n=2}^{N_1} P_{1,n,l}a_{1,l}a_{1,l}^H + R_{xx} \tag{B.22}$$

which by multiplying with $a_{1,1}$ gives:

$$(R_{yy,l} - R_{xx})a_{1,l} \tag{B.23}$$

where $\eta$ is a real constant. The steering vector $a_{1,1}$ is therefore the eigenvector corresponding to the largest eigenvalue of the above eigenvalue problem.

The interference covariance matrix $R_{uu,1}$ used in the optimum weights (B.15) needs to be estimated. However, since orthogonal codes are typically used in the downlink, making the interference covariance matrix difficult to estimate, exemplary embodiments of the present invention substitute equivalents therefore in the above equation (B.15). Specifically, Applicants note that $R_{uu,1}$ can be replaced by either $R_{xx}$ or $R_{yy,1}$ in (B.15) and the optimum combining is still obtained asymptotically. This can be shown by using the matrix inversion lemma.

According to another exemplary embodiment of the present invention, the weights, which are calculated separately above for each time delay, can be calculated simultaneously as follows. In equation (B.15), above, the variables $R_{uu,1}$ and $a_{1,1}$ are replaced by $R_{uu}$ and $a_1$ where:

$R_{uu} = E\{u_{11} * u^H_{1,1}\}$ with $u_{1,1}$ being a vector containing all $u_{1,1,1}$ and $a_1$ being a vector containing all $a_{1,1}$, thus stacking the various calculations to be performed simultaneously.

The foregoing describes how to obtain the weighting factors used in mobile receiver structures according to the present invention. Applicants have simulated the implementation of these structures and have found them to provide significant received signal quality improvements over conventional RAKE receivers, even when those conventional receivers are used with plural antennas. The results of these simulations will now be described with respect to the graphs illustrated in FIGS. 4–6. Therein, the simulation used the following common system parameters: spreading factor=32, users per cell=6 and thermal noise variance=1.

Figure 4:
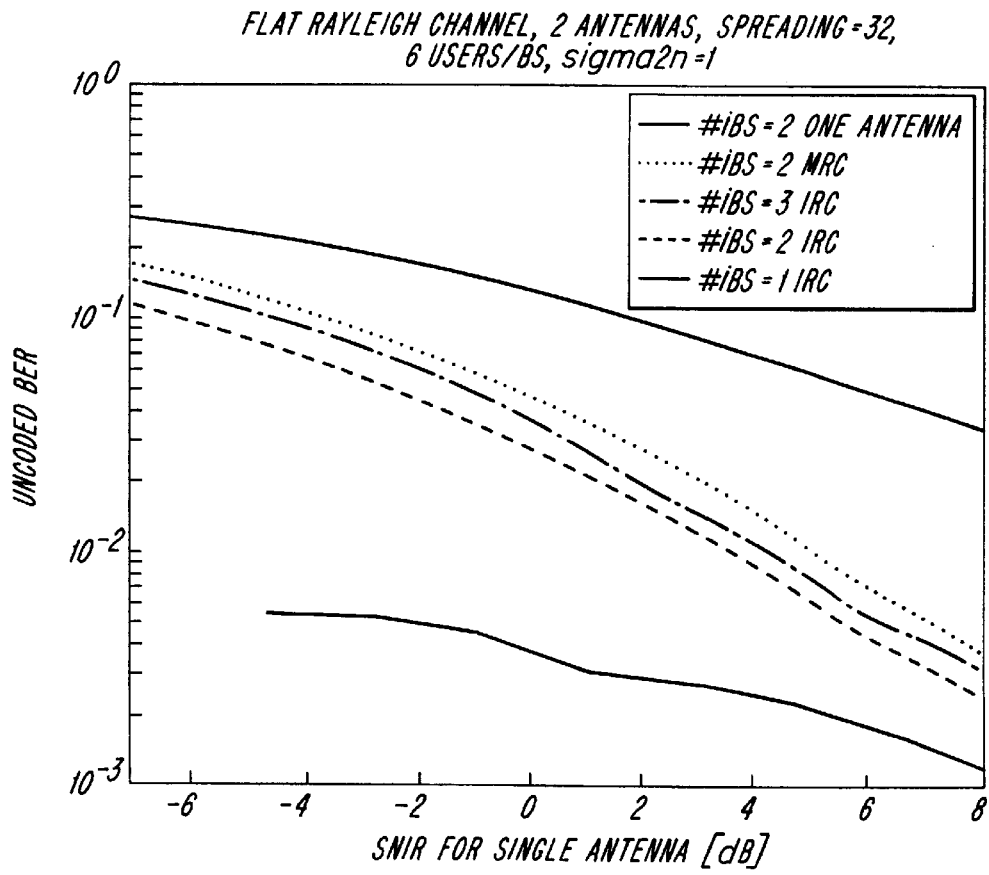
FIG. 4 is a graph depicting benefits attributable to the present invention using a simulation having a one-ray Rayleigh distributed channel with two antennas.

FIG. 4 depicts the results of a simulation wherein a single desired signal ray is received by the mobile station. The uppermost function in the graph represents the uncoded bit error rate vs. signal to noise ratio for a mobile station having only a single antenna, i.e., no diversity combining. Not surprisingly, this simulation exhibited the poorest quality (highest BER). The next poorest signal quality was experienced by the simulated mobile station having two antennas, but using conventional RAKE (MRC combining) techniques. Then, the present invention was simulated three times. In descending BER graph order, once using three base station interferers, once using two base station interferers and once using a single base station interferer. Note that for a two antenna mobile station, interference from a single base station can be more significantly suppressed, providing much better received signal quality. Thus, the present invention provides an excellent solution to the problem raised by the introduction of home base stations described above. As the number of interferers exceeds the additional number of antennas, performance begins to approach the conventional RAKE receiver, but is still better by about 2dB.

Figure 5:
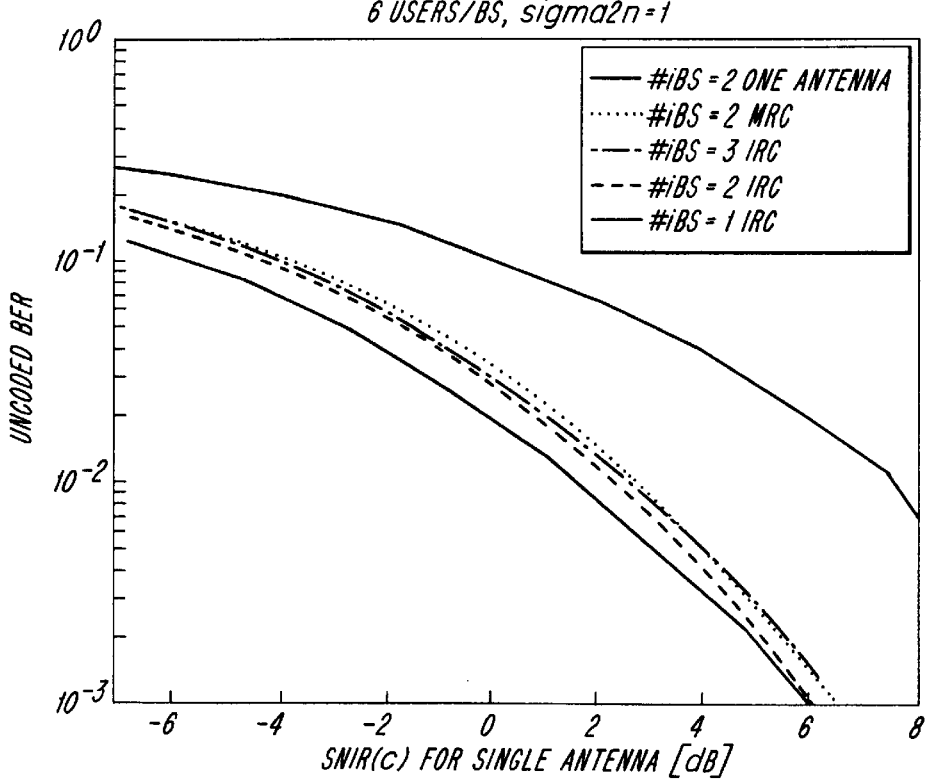
FIG. 5 illustrates simulation results for receivers according to the present invention as compared with conventional receivers using a three-ray channel simulation with two antennas.

FIG. 5 shows simulation results for a mobile station having two antennas, wherein each channel includes three rays. In this case, the results from the conventional MRC approach and the three simulations of the present invention are grouped more closely together than the results in FIG. 4, even when only one interfering base station is considered. This leads to the conclusion that interference suppression according to the present invention at the mobile station is greatest when the number of interfering base station rays is less than or equal to the number of antennas (or antenna elements) used by the mobile station minus one.

Figure 6:
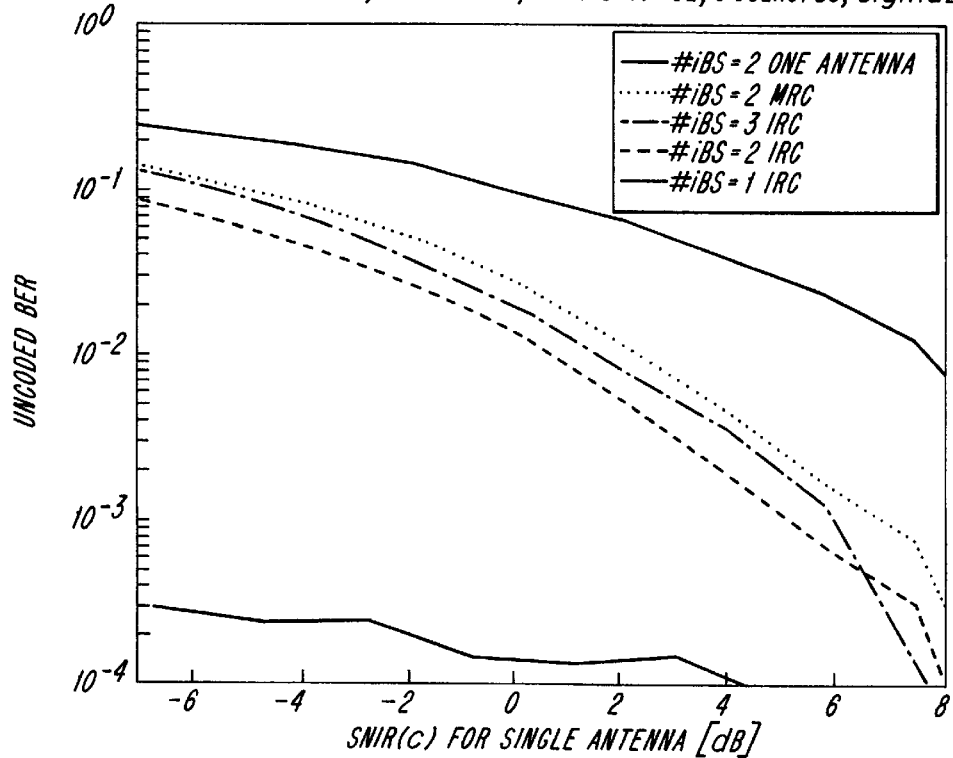
FIG. 6 illustrates simulation results for three-ray channel with two antennas having one ray from undesired base stations.

This latter conclusion is buttressed by the simulation results shown in FIG. 6. Therein, the desired channel has three rays received by the mobile station, but the interfering base station(s) has only one. Unlike the results seen in FIG. 5, note that for a single interfering base station having only one signal ray, virtually complete interference suppression is achieved using two antennas at the mobile station.

As mentioned above, in future CDMA standards and systems high bit rates will be supported. One technique for achieving high bit rates in CDMA system is to provide multiple codes to each individual user. That is a user may be allocated multiple spreading codes, each of which is used to support a lower bit rate connection.

When a mobile station receives a multicode signal, it could process the composite signal separately for each spreading code assigned thereto. Alternatively, if interference suppression techniques are used to process received signals in the downlink according to the present invention, the fact that each of the mobile station's intended signals has passed through the same radio channel (i.e, same $a_{1,1}$) and is disturbed by the same interference (i.e., same $R_{uu,1}$) can be used to reduce the computation complexity. For example, these vectors can be estimated just once regardless of how many spreading codes have been assigned to the mobile station and these estimates used to process the composite signal multiple times, once for each assigned code. Alternatively, estimates of these vectors can be made using all of the signals in the composite signal simultaneously. This reduces the estimation error in the estimates and, therefore, improves performance.

The present invention has been described in terms of specific embodiments ton facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being commensurate in scope with the following claims including equivalents thereof.

What is claimed is:

1. A mobile station for diversity combining different versions of a received signal and rejecting an interfering signal using interference suppression comprising:

at least two antenna elements for receiving first and second signals;

a plurality of receive signal processing branches for processing said first and second signals, each branch including a delay unit for generating a delayed version of a signal input thereto, a despreading unit for despreading said delayed version of said signal and a weighting unit for weighting an output of said despreading unit using a weighting factor based on a covariance of said interfering signal;

a plurality of first combiners for combining outputs from weighting units in processing branches having corresponding delays; and a second combiner for combining outputs from said plurality of first combiners, said weighting factors being selected to reject said interfering signal.

2. The mobile station of claim 1, wherein said weighting factors are calculated using a combination of an interference rejection vector and a maximum ratio combining vector.

3. The mobile station of claim 1, wherein said weighting factors are calculated using a covariance of said unwanted signals.

4. The mobile station of claim 1, wherein said weighting factors are calculated using a covariance of all received signals.

5. The mobile station of claim 1, wherein said weighting factors are calculated separately for each delay.

6. The mobile station of claim 1, wherein said weighting factors are calculated simultaneously for all delays in a stacking operation.

7. A CDMA radiocommunication system having at least one base station for transmitting a desired CDMA signal to a mobile station and at least one base station for transmitting at least one interfering CDMA signal to said mobile station, said mobile station comprising:

antenna means for receiving at least two versions of said desired CDMA signal; and receive signal processing means for detecting information intended for said mobile station using a combination of information contained in said at least two versions of said desired CDMA signal, said receive signal processing means including means for rejecting said at least one interfering CDMA signal, wherein said means for rejecting said at least one interfering CDMA signal uses weighting factors which are calculated using a combination of an interference rejection vector and a maximum ratio combining vector.

8. The mobile station of claim 7, wherein said means for rejecting said at least one interfering signal calculates said weighting factors using a covariance of said signals from said at least one base station transmitting said at least one interfering CDMA signal.

9. The mobile station of claim 7, wherein means for rejecting said at least one interfering signal calculates said weighting factors using a covariance of all received signals.

10. The mobile station of claim 7, wherein said weighting factors are calculated separately for each of a plurality of delays.

11. The mobile station of claim 7, wherein said weighting factors are calculated simultaneously for each of a plurality of delays using in a stacking operation.

12. A mobile station comprising:

at least two antenna elements, each for receiving a signal intended for said mobile station as well as at least one interfering signal; and means for combining said signals received on each of said at least two antenna elements in a manner which suppresses said at least one interfering signal using an interference covariance matrix of said at least one interfering signal.

13. A radiocommunication system comprising:

a home base station for restricted access to equipment associated with a first user, which home base station transmits an interfering signal with respect to equipment associated with a second user;

a cellular base station for transmitting a desired signal to said second user;

a mobile station associated with said second user including:

two antenna elements for receiving a first and a second version of said desired signal, respectively, and for receiving said interfering signal transmitted by said home base station;

a signal processing unit for combining said first and second versions of said desired signal in a manner which suppresses said interfering signal using one of a covariance matrix associated with said interfering signals and a covariance matrix associated with both said desired signal and said interfering signal.

14. A method for processing a composite CDMA signal received by a mobile station comprising the steps of:

assigning a plurality of spreading codes to said mobile station;

despreading said composite CDMA signal using each of said plurality of spreading codes to produce a plurality of despread signals;

calculating a covariance matrix for one of said plurality of despread signals to reject interference associated with undesired signals received in said composite CDMA signal; and applying said covariance matrix to each of other of said plurality of despread signals to reject interference associated with undesired signals received in said composite CDMA signal.

15. The mobile station of claim 12 further comprising:

means for calculating weights separately for each of a plurality of time delays using said covariance matrix.

16. The mobile station of claim 12, wherein said interference covariance matrix of said at least one interfering signal is estimated based on a covariance of a pre-correlation vector.

17. The mobile station of claim 12, wherein said interference covariance matrix of said at least one interfering signal is estimated based on a covariance of a post-correlation vector.

18. The radiocommunication system of claim 13, wherein said interference covariance matrix of said at least one interfering signal is estimated based on a covariance of a pre-correlation vector.

19. The radiocommunication system of claim 13, wherein said interference covariance matrix of said at least one interfering signal is estimated based on a covariance of a post-correlation vector.

20. The method of claim 14, wherein said interference covariance matrix of said at least one interfering signal is estimated based on a covariance of a pre-correlation vector.

21. The method of claim 14, wherein said interference covariance matrix of said at least one interfering signal is estimated based on a covariance of a post-correlation vector.

* * * * *